US011948599B2

(12) United States Patent
Shiloh Perl et al.

(10) Patent No.: US 11,948,599 B2
(45) Date of Patent: Apr. 2, 2024

(54) AUDIO EVENT DETECTION WITH WINDOW-BASED PREDICTION

(71) Applicant: Microsoft Technology Licensing, LLC, Redmond, WA (US)

(72) Inventors: Lihi Ahuva Shiloh Perl, Tel-Aviv (IL); Ben Fishman, Herzelya (IL); Gilad Pundak, Rehovot (IL); Yonit Hoffman, Herzeliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 276 days.

(21) Appl. No.: 17/647,318

(22) Filed: Jan. 6, 2022

(65) Prior Publication Data

US 2023/0215460 A1    Jul. 6, 2023

(51) Int. Cl.
*G10L 25/93*      (2013.01)
*G06N 3/048*     (2023.01)
*G06N 3/08*       (2023.01)
*G10L 25/45*     (2013.01)

(52) U.S. Cl.
CPC .............. *G10L 25/93* (2013.01); *G06N 3/048* (2023.01); *G06N 3/08* (2013.01); *G10L 25/45* (2013.01)

(58) Field of Classification Search
CPC ......... G10L 25/93; G10L 25/45; G10L 25/57; G10L 25/30; G10L 25/51; G06N 3/048; G06N 3/08; G06N 3/044; G06N 3/045; G06N 3/084
USPC ...................................................... 704/200
See application file for complete search history.

(56) References Cited

U.S. PATENT DOCUMENTS

| | | | | |
|---|---|---|---|---|
| 9,858,340 | B1 * | 1/2018 | Frey | G10L 15/005 |
| 10,048,973 | B1 * | 8/2018 | Barjatia | G06N 3/02 |
| 10,210,860 | B1 * | 2/2019 | Ward | G06N 3/044 |
| 10,446,170 | B1 * | 10/2019 | Chen | G06N 20/00 |
| 10,600,408 | B1 * | 3/2020 | Smith | G10L 13/10 |

(Continued)

OTHER PUBLICATIONS

Ravanelli, et al., "Speaker Recognition from Raw Waveform with SincNet", In Proceedings of IEEE Spoken Language Technology Workshop, Dec. 18, 2018, pp. 1021-1028.

(Continued)

*Primary Examiner* — Thuykhanh Le
(74) *Attorney, Agent, or Firm* — Newport IP, LLC; Jacob P. Rohwer

(57) ABSTRACT

A computing system for a plurality of classes of audio events is provided, including one or more processors configured to divide a run-time audio signal into a plurality of segments and process each segment of the run-time audio signal in a time domain to generate a normalized time domain representation of each segment. The processor is further configured to feed the normalized time domain representation of each segment to an input layer of a trained neural network. The processor is further configured to generate, by the neural network, a plurality of predicted classification scores and associated probabilities for each class of audio event contained in each segment of the run-time input audio signal. In post-processing, the processor is further configured to generate smoothed predicted classification scores, associated smoothed probabilities, and class window confidence values for each class for each of a plurality of candidate window sizes.

20 Claims, 11 Drawing Sheets

(56) References Cited

U.S. PATENT DOCUMENTS

| | | | |
|---|---|---|---|
| 11,205,420 B1* | 12/2021 | Fu | G06N 3/04 |
| 11,461,642 B2* | 10/2022 | Pineda de Gyvez | G06F 3/017 |
| 11,727,922 B2* | 8/2023 | Villaizan | G10L 15/26 |
| | | | 704/234 |
| 2002/0194002 A1* | 12/2002 | Petrushin | G10L 17/26 |
| | | | 704/E17.002 |
| 2013/0058488 A1* | 3/2013 | Cheng | G10L 25/81 |
| | | | 381/56 |
| 2015/0073306 A1* | 3/2015 | Abeyratne | G16H 50/30 |
| | | | 600/586 |
| 2016/0049915 A1* | 2/2016 | Wang | G10L 25/51 |
| | | | 381/107 |
| 2016/0322066 A1* | 11/2016 | Sharifi | G06F 16/683 |
| 2017/0061978 A1* | 3/2017 | Wang | G10L 21/0232 |
| 2017/0372725 A1* | 12/2017 | Khoury | G10L 25/78 |
| 2018/0158463 A1* | 6/2018 | Ge | G10L 17/04 |
| 2018/0247642 A1* | 8/2018 | Kim | G10L 15/16 |
| 2019/0035431 A1* | 1/2019 | Attorre | G10L 25/30 |
| 2019/0378537 A1* | 12/2019 | Li | G10L 15/063 |
| 2019/0392852 A1* | 12/2019 | Hijazi | G10L 21/055 |
| 2020/0043509 A1* | 2/2020 | Chen | G06N 20/00 |
| 2020/0075033 A1* | 3/2020 | Hijazi | G06N 3/086 |
| 2020/0117887 A1* | 4/2020 | Chaudhuri | G06N 5/046 |
| 2020/0135228 A1* | 4/2020 | Ci | G10L 25/51 |
| 2020/0160845 A1* | 5/2020 | Lavilla | G10L 15/005 |
| 2020/0335093 A1* | 10/2020 | Senior | G10L 15/16 |
| 2020/0383633 A1* | 12/2020 | Su | A61B 5/0816 |
| 2021/0005067 A1* | 1/2021 | Salekin | G08B 13/1672 |
| 2021/0110813 A1* | 4/2021 | Khoury | G10L 17/18 |
| 2021/0158086 A1* | 5/2021 | Salamon | G10L 25/51 |
| 2021/0272555 A1* | 9/2021 | Larsson | G06N 3/08 |
| 2021/0335064 A1* | 10/2021 | Kim | G07C 5/0833 |
| 2022/0005493 A1* | 1/2022 | Li | G10L 25/78 |
| 2022/0036915 A1* | 2/2022 | Koretzky | G10L 21/14 |
| 2022/0130415 A1* | 4/2022 | Garrison | G10L 15/02 |
| 2022/0165297 A1* | 5/2022 | Wang | G10L 25/93 |
| 2022/0319660 A1* | 10/2022 | Belanger-Basset | G06V 40/28 |
| 2022/0335966 A1* | 10/2022 | Ayllón Álvarez | G10L 15/02 |
| 2023/0060936 A1* | 3/2023 | Thiruvenkatanathan | G10L 25/24 |
| 2023/0072171 A1* | 3/2023 | Sengupta | G06N 3/086 |
| 2023/0119791 A1* | 4/2023 | Kim | G10L 25/51 |
| | | | 704/232 |
| 2023/0126779 A1* | 4/2023 | de la Rey | G10L 25/51 |
| | | | 704/232 |
| 2023/0130777 A1* | 4/2023 | Spall | G10L 15/16 |
| | | | 704/232 |
| 2023/0130844 A1* | 4/2023 | de la Rey | G10L 21/0308 |
| | | | 704/232 |
| 2023/0215460 A1* | 7/2023 | Shiloh Perl | G10L 25/30 |
| | | | 704/200 |
| 2023/0255553 A1* | 8/2023 | Weston | A61B 5/7264 |
| | | | 600/586 |

OTHER PUBLICATIONS

Abdoli, et al., "End-to-End Environmental Sound Classification using a 1D Convolutional Neural Network", In Repository of arXiv:1904.08990v1, Apr. 18, 2019, pp. 1-24.

Salamon, et al., "Deep Convolutional Neural Networks and Data Augmentation for Environmental Sound Classification", In Journal of IEEE Signal Processing Letters, vol. 24, Issue 3, Mar. 2017, pp. 279-283.

* cited by examiner

Class 1: Siren

Class 2: Dog barking

Threshold: 0.5 window size $N_c=3$ window range
$[n-(N_c/2) : n+(N_c/2)]$ prob matrix — 64

| segment | class 1 | class 2 |
|---|---|---|
| 0 | 0.75 | 0.23 |
| 1 | 0.76 | 0.67 |
| 2 | 0.64 | 0.57 |
| 3 | 0.67 | 0.49 |
| 4 | 0.49 | 0.67 |
| 5 | 0.48 | 0.78 |
| 6 | 0.89 | 0.89 |
| 7 | 0.98 | 0.77 |
| 8 | 0.12 | 0.42 |
| 9 | 0.67 | 0.23 | pred matrix — 62

| segment | class 1 | class 2 |
|---|---|---|
| 0 | 1 | 0 |
| 1 | 1 | 1 |
| 2 | 1 | 1 |
| 3 | 1 | 0 |
| 4 | 0 | 1 |
| 5 | 0 | 1 |
| 6 | 1 | 1 |
| 7 | 1 | 1 |
| 8 | 0 | 0 |
| 9 | 1 | 0 | smooth_prob — 77

| segment | class 1 | class 2 |
|---|---|---|
| 0 | 0.76 | 0.45 |
| 1 | 0.72 | 0.49 |
| 2 | 0.69 | 0.58 |
| 3 | 0.60 | 0.58 |
| 4 | 0.55 | 0.65 |
| 5 | 0.62 | 0.78 |
| 6 | 0.78 | 0.81 |
| 7 | 0.66 | 0.69 |
| 8 | 0.59 | 0.47 |
| 9 | 0.40 | 0.33 | smooth_pred — 76

| segment | class 1 | class 2 |
|---|---|---|
| 0 | 1 | 0.50 |
| 1 | 1 | 0.67 |
| 2 | 1 | 0.67 |
| 3 | 0.67 | 0.67 |
| 4 | 0.33 | 0.67 |
| 5 | 0.33 | 1 |
| 6 | 0.67 | 1 |
| 7 | 0.67 | 0.67 |
| 8 | 0.67 | 0.33 |
| 9 | 0.50 | 0 |

(1) $\quad w_{class} = \dfrac{\sum smooth\_pred_{class}[i]}{\|smooth\_pred_{class}\|}$ (2) $\quad confidence_{class} = w_{class} \dfrac{\sum smooth\_pred_{class}[i] * smooth\_prob_{class}[i]}{\sum smooth\_pred_{class}[i]}$ Inserting (1) into (2):

(3) $\quad confidence_{class} = \dfrac{\sout{\sum smooth\_pred_{class}[i]}}{\|smooth\_pred_{class}\|} \dfrac{\sum smooth\_pred_{class}[i] \cdot smooth\_prob_{class}[i]}{\sout{\sum smooth\_pred_{class}[i]}}$ $\quad = \dfrac{\sum smooth\_pred_{class}[i] \cdot smooth\_prob_{class}[i]}{\|smooth\_pred_{class}\|}$

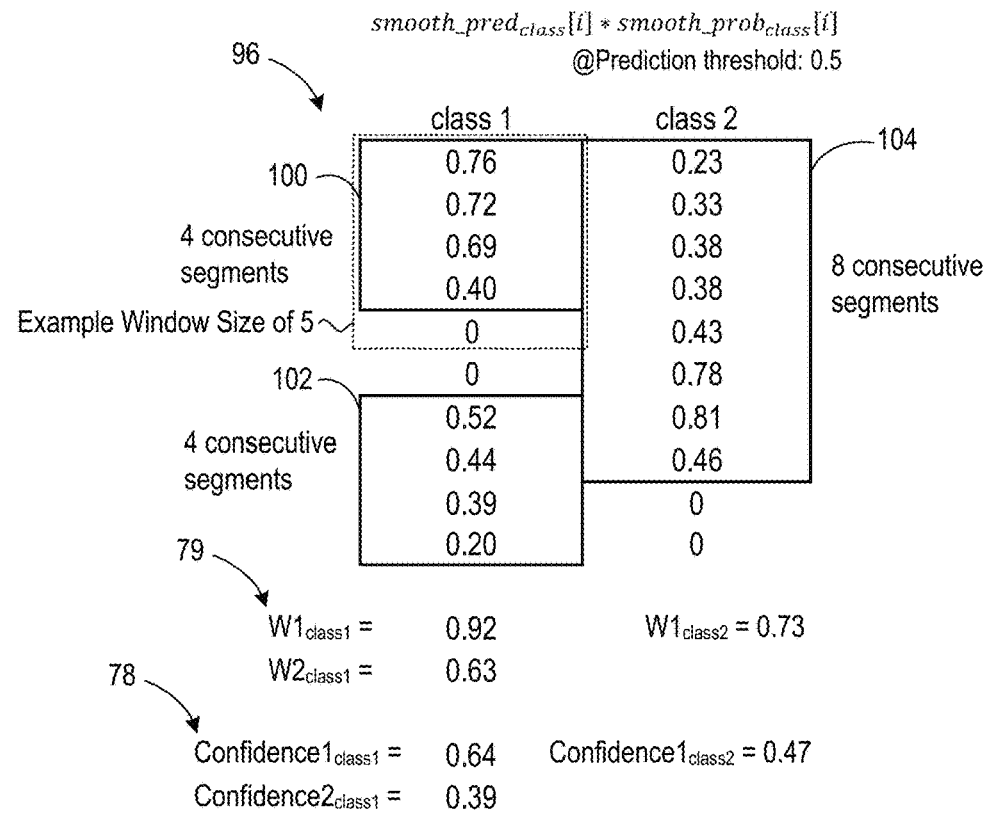

FIG. 3B

AUDIO EVENT DETECTION WITH WINDOW-BASED PREDICTION

BACKGROUND

In recent years, artificial intelligence (AI) such as convolutional neural networks have been utilized to analyze audio signals for purposes including speaker identification and sound event detection. Sound event detection is the task of recognizing sound events and their respective temporal start and end times in a recording. Sound event detection can be performed on real time audio, audio files, or video files including audio tracks. Opportunities exist to increase the robustness of sound event detection techniques, to increase the adoption and utility of these technologies.

SUMMARY

Computer systems and methods are provided for detecting a plurality of classes of audio events. According to one aspect, a computer system is provided that includes one or more processors having associated memory storing instructions that cause the one or more processors to, at run time, receive a run-time audio signal, divide the run-time audio signal into a plurality of segments, each segment overlapping at least one adjacent segment by an overlap amount, and process each segment of the run-time audio signal in a time domain to generate a normalized time domain representation of each segment. The one or more processors is further configured to feed the normalized time domain representation of each segment to an input layer of a trained neural network, and generate, by the neural network, a plurality of predicted classification scores and associated probabilities for each class of audio event contained in each segment of the run-time input audio signal. The one or more processors is further configured to establish a plurality of candidate window sizes for post-processing. The one or more processors is further configured to generate smoothed predicted classification scores and associated smoothed probabilities for each class for each of the candidate window sizes by applying a predetermined smoothing function and a predetermined prediction threshold to the predicted classification scores and the associated probabilities, and output the smoothed predicted classification scores and the associated probabilities. The one or more processors is further configured to determine a subset of the smoothed predicted classification scores that exceed the predetermined prediction threshold for each class and determine a number of consecutive segments within each window having a respective one of the candidate window sizes in which the smoothed predicted classification scores that exceed the predetermined prediction threshold for each class. The one or more processors is further configured to compute a class window confidence value for each of the windows of consecutive segments for each class based on the smoothed predicted classification scores, associated smoothed probabilities, and the number of the consecutive segments.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A and 3B show an example of the smoothed predicted classification scores, associated smoothed probabilities, and class-window confidence values being computed using the computing system of FIGS. 1 and 2.

DETAILED DESCRIPTION

As briefly discussed above, sound event detection can be performed on various audio data using an AI model such as a convolutional neutral network that has been trained to detect different sound events in an audio signal. However, one technical challenge that sound event detection models face is accurately detecting sound events in various acoustic environments having different background noise. The presence of background noise can cause a trained AI model to make errors such as failing to recognize an audio event (i.e., false negative) or falsely recognizing an audio event (i.e., false positive).

To address the issues discussed above, a computing system is disclosed herein that is configured to divide the run-time audio signal into a plurality of segments, each segment overlapping with at least one adjacent segment by an overlap amount, feed a normalized time domain representation of each segment to a trained neural network, and generate a smoothed predicted classification score, an associated smoothed probability, and a class-window confidence value for each candidate window size, for each class subject to detection.

Figure 1:
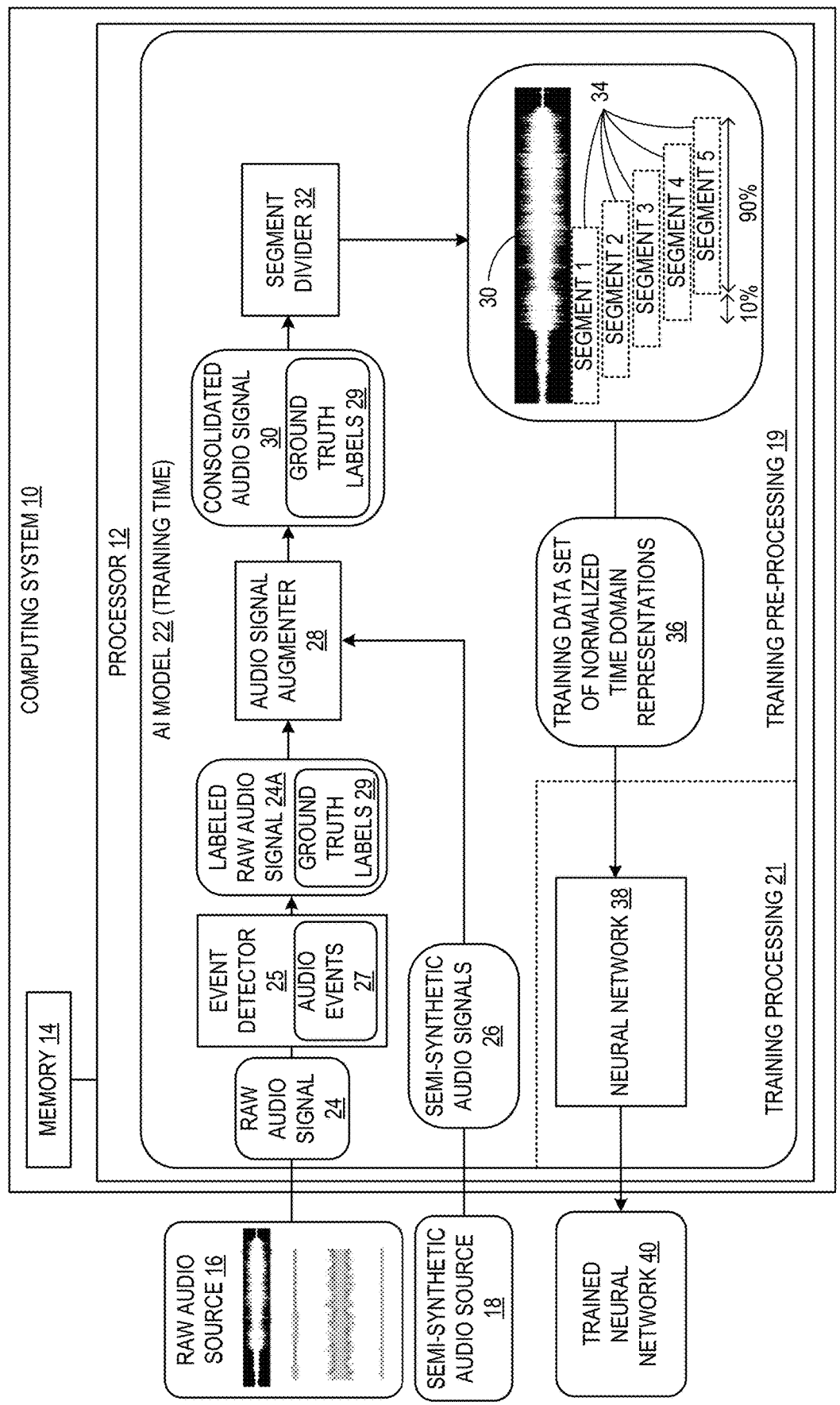
FIG. 1 shows a schematic view of a computing system including an AI model configured to, at training time, augment a raw audio signal with semi-synthetic audio signals to generate a consolidated audio signal, divide the consolidated audio signal into a plurality of segments and train a neural network with a training data set.
Figure 2:
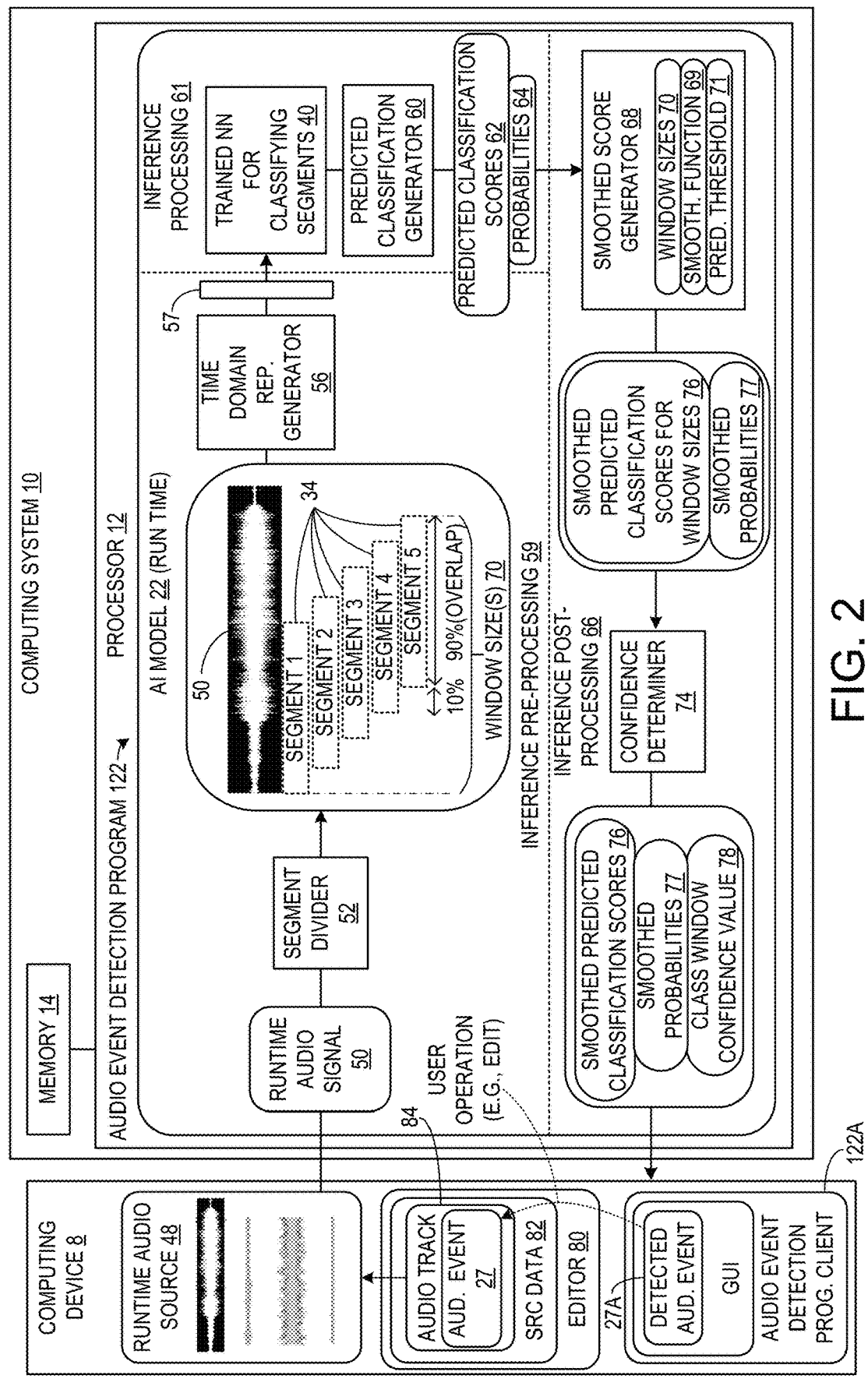
FIG. 2 shows a schematic view of the computing system of FIG. 1, further include an AI model configured to, at run time, divide a run-time audio signal into a plurality of segments, feed a normalized time domain representation of each segment to a trained neural network and generate a smoothed predicted classification score, an associated smoothed probability, and a class-window confidence value for each candidate window size, for each class.

FIG. 1 shows a schematic view of a computing system 10 including a processor 12 configured to execute an AI model 22 that can be trained to detect a plurality of classes of audio events at training time. The illustrated training processing pipeline traverses through two phases: training pre-processing 19, and training processing 21, detailed aspects of which are described below. The processor 12 may be configured to execute instructions using portions of memory 14 to perform the functions and processes of the AI model 22 described herein. FIG. 1 illustrates aspects of the system at training time, that is, when the AI model 22 is trained, while FIG. 2 illustrates aspects of the system 10 at run time, that is, when the trained AI model 22 is applied to identify audio events in an audio signal.

The computing system 10 may include one or more processors 12 having associated memory 14. For example, the computing system 10 may include a cloud server platform including a plurality of server devices, and the one or more processors 12 may be one processor of a single server device, or multiple processors of multiple server devices. The computer system 10 may also include one or more client devices in communication with the server devices, and one or more of processors 12 may be situated in such a client device. Typically, training and run-time operations are executed on different devices (e.g., a first computing device and a second computing device) of the computer system, although they may be executed by the same device. Below, the functions of computing system 10 will be described as being executed by processor 12 by way of example, and this description shall be understood to include execution on one or more processors distributed among one or more of the devices discussed above.

Continuing with FIG. 1, the computer system 10 is configured to, during training pre-processing 19 at training time, augment a raw audio signal 24 with semi-synthetic audio signals 26 to generate a consolidated audio signal 30, divide the consolidated audio signal 30 into a plurality of segments 34 and train a neural network 38 with a training data set prepared using the consolidated audio signal. The AI model 22 may include an audio signal augmenter 28, a segment divider 32, and the neural network 38 configured in a training data pre-processing pipeline to perform the operations described below.

In accordance with the example shown in FIG. 1, the associated memory 14 may store instructions that cause the processor 12 to receive a raw audio signal 24 from a raw audio source 16 and obtain semi-synthetic audio signals 26 from a semi-synthetic audio source 18, during training pre-processing 19. The raw audio source 16 may be another computing device, such as a media server of an audiovisual production studio, a media sharing website, a data storage device, or camera or microphone providing a live audio feed. The raw audio signal 24 may contain environmental or day-to-day sounds that form audio events 27 to be detected by the computer system 10, such as a siren, alarm, dog barking, baby crying, gunshots, explosions, applause, and/or laughter, etc. The audio events are not limited to this list, but rather extensible by the users of the computer system 10. Each audio event 27 is detectable by an event detector 25, as described below. The semi-synthetic audio signals 26 may contain various background sounds such as music, speech, and ambient noises. It will be appreciated that the presence of unanticipated background sounds in a raw audio signal can make detection of audio events in the raw audio signal difficult. To address this issue, the semi-synthetic audio signals 26 are added to the raw audio signal 24 during training, thereby resulting in a training data set 36 with a greater variety of background sounds, which in turn results in a trained neural network that can better distinguish the target audio events even in the presence of various background sounds.

After receiving the raw audio signal 24, the processor 12 may be further configured to tag respective portions of the raw audio signal 24 with ground truth labels 29 for a plurality of classes of audio events 27 using an event detector 25, to thereby produce a labeled raw audio signal 24A, during training pre-processing 19. The classes of audio events 27 may be defined by a user of the computer system 10 and may include a siren, alarm, dog barking, baby crying, gunshot, and laughter, as some examples. The raw audio signal 24 may be extracted from a video file or streaming video transmission, such as a movie, an online video, or a personal recorded video, as some examples, or may be an audio recording or live streaming audio transmission. In one example, the tagging may be performed by an event detector 25 such as a convolutional neural network that is trained to recognize the audio events in an audio signal either comparatively free of background noise, or that contains a type, volume, or frequency of background noise that is lower or different than is introduced by the semi-synthetic audio signals. Alternatively, the tagging may be performed manually by hand by a human operator instead of by the event detector 25.

The processor 12 may be further configured to augment, via the audio signal augmenter 28, the raw audio signal 24 with the obtained semi-synthetic audio signals 26 to generate a consolidated audio signal 30 including a normalized time domain representation of the raw audio signal 24 and the generated semi-synthetic audio signals 26, during training pre-processing 19. The semi-synthetic audio signals 26 are randomly or pseudo-randomly inserted into different locations in the raw audio signal 30. Both the type of background sounds in the semi synthetic audio signals 26 and the level of randomization in augmenting the raw audio signal 24 with the semi-synthetic audio signals 26 may be changed to produce a large amount of training data with variation in environmental and background noise to effectively train the AI model 22. The consolidated audio signal 30 includes the associated ground truth labels 29 that were originally labeled by the event detector 25.

During training pre-processing 19, the processor 12 may be further configured to divide, via the segment divider 32, the consolidated audio signal 30 into a plurality of segments 34, each segment overlapping at least one adjacent segment by an overlap amount, and each of the plurality of segments 34 retaining any ground truth label associated with it. As depicted in FIG. 1, each of the plurality of segments 34 may overlap with one adjacent segment by an overlap amount of 0% to 99%. In the depicted example, the overlap amount may be set to between 90% and 99%. For instance, the duration of each segment may be set as 1000 milliseconds (1 second), while the segment overlap may be set to 900 milliseconds, i.e., 90%. In other examples, the overlap amount may be set to 60% or 80%, for example. Some audio events such as a gunshot are transient and might be overlooked (i.e., not detected) if the system 10 were configured with no overlap and thus appeared in one segment only. However, the high percentage of overlap enables the transient audio events to appear in multiple segments and be processed by a neural network multiple times, increasing the probability that the AI model 22 is effectively trained to recognize such transient audio events.

During training pre-processing 19, the processor 12 may be further configured to process each segment in a time domain to generate a normalized time domain representation of each segment, in which the segments 34 are tagged with the ground truth labels for the plurality of classes, to form a training data set of normalized time domain representations 36 of the segments 34 and associated ground truth labels 29 for the plurality of classes for each segment. According to one example implementation of the present disclosure, the consolidated audio signal 30 may be converted to one-dimensional time domain representations. This has the technical advantage of obviating the requirement to convert the raw audio signal to a two-dimensional time and frequency domain representation, which saves processing time. A one-dimensional time domain conversion makes configuration of one-dimensional neural networks simple and compact, allowing the AI model to achieve a small footprint and fast computational time.

During training processing 21, the processor 12 may be further configured to train the neural network 38 to classify the normalized time domain representation of each segment with a predicted classification score for each of the plurality of classes, based on the training data set of normalized time domain representations 36. For instance, a convolutional neural network may be employed as the neural network 38. The architecture of the convolutional neural network may include three convolutional layers on the input side, with the second layer having a filter length set to 11, and the third layer having a filter length set to 7. The three convolutional layers may be followed by three fully connected layers of 256 neurons per layer. The output layer may be configured to predicted multiple classes per input segment, which is accomplished by using sigmoid activation functions in the output layer and by setting the training loss to binary cross entropy loss with logits loss. Of course, this is one particular example architecture, and it will be appreciated that variations may be employed in other examples. Furthermore, it will be appreciated that other neural network architectures such as a recurrent neural network (RNN), including a long short-term memory (LSTM) RNN, may be employed, instead of the convolutional neural network. After training the neural network 38, the computer system 10 produces and outputs a trained neural network 40, which may be used for audio event detection in the manner discussed below.

FIG. 2 shows a schematic view of the computing system 10 with processor 12 executing an audio event detection program 122, which includes the AI model 22 with the trained neural network 40, at run time, to perform inference on a run-time audio signal 50. The illustrated inference processing pipeline traverses through three phases: inference pre-processing 59, inference processing 61, and inference post-processing 66. As an overview, during inference pre-processing 59, the processor 12, via the AI model 22, is configured to receive the run-time audio signal 50 from a run time audio source 48, divide the run-time audio signal 50 into a plurality of segments 34 using the segment divider 52 of the AI model, and produce a one-dimensional, normalized time domain representation 57 of each segment 34 using a time domain representation generator 56. During inference processing 61, the processor 12, via the AI model 22, is configured to feed the normalized time domain representation 57 of each segment 34 to the trained neural network 40, and generate classification scores 62 and probabilities 64 for the segments 34. During inference post-processing 66, a smoothed score generator 68 of the AI model 22 is configured to generate a smoothed predicted classification score 76 and smoothed probability 77 based on the predicted classification scores 62 and probabilities 64 for each segment 34 within each candidate window size 70, and a confidence determiner 74 of the AI model 22 is configured to generate an associated class-window confidence value 78 for each candidate window size 70. These are output, for example, to the audio event detection program 120 or to an audio event detection program client 122A executed on computing device 8, as shown. The processor 12 may be configured to execute instructions using portions of the memory 14 to perform the functions and processes of the AI model 22 described herein. It will be appreciated that the computer system 10 and the processor 12 that execute the AI model 22 at training time and the AI model 22 at run time may be the same or different, as described above. Further details of an example implementation of these inference phases will now be described.

Continuing with FIG. 2 for a detailed discussion of the inference pipeline, at the commencement of inference pre-processing 59 the associated memory 14 executes stored instructions that cause the processor 12 to receive the run-time audio signal 50 from a run-time audio source 48 stored, for example, in computing device 8. Computing device 8 may be, for example, a computing device used in media production, and may include an editor 80 and the audio event detection program client 122A. Alternatively, the computing device 8 may be configured as a streaming media server, a media download server, or other media storage device. Further, computing device 8 may include a web enabled camera or microphone providing a live audio feed, for example.

The run-time audio signal 50 may be a raw audio signal that includes audio events 27 that the trained neural network 40 has been trained to identify, such as a siren, alarm, dog barking, baby crying, gunshot, and laughter. These are simply examples, and it will be appreciated that the audio events 27 may be defined by, and thus are extensible by, a user of the computer system 10, who can train event detector 25 to tag such events during training, as described above. The run-time audio signal 50 may also include various background noises such as music, conversations, traffic noise, etc.

In the illustrated example, the defined audio event 27 is included in an audio track 84 of editable source data 82 such as a video, and the audio event 27 is editable by a curator of the video using an editor program 80 on the video or a master file for the video. As discussed below, once the AI model 22 has detected a detected audio event 27A, it can be displayed in a GUI 120 of an audio event detection program 122 (See FIGS. 4A-4D), and a user may engage in a user operation, such as an edit on a portion of the audio track 84 corresponding to the detected audio event 27A. As one brief example, each of the classes is a defined audio event 27 such as a siren, alarm, dog barking, baby crying, gunshot, laughter, and each audio event 27 that is detected may be edited out of the audio track 84 and/or replaced with an alternative sound. As discussed above, the defined audio event 27 may be characterized by audio features that are shorter duration than a length of the segments 34, as transient audio events such as a dog barking or gunshot sound may occur within the time frame of the segments. Alternatively, the audio events 27 may span an entire segment but be recognizable via audio features that are detectable within each individual segment.

Returning to inference pre-processing 59, the processor 12 may be further configured to divide, via the segment divider 50, the run-time audio signal 50 into a plurality of segments 34, each segment overlapping with at least one adjacent segment by an overlap amount. As depicted in FIG. 2, each of the plurality of segments 34 may overlap with one adjacent segment by a predetermined overlap amount such as 90% or more. In other examples, the overlap amount may be set to 80% or 95%, for example. The overlap during training and run time is typically the same. Thus, for instance, the duration of each segment may be set as 1000 milliseconds (1 second), while the segment overlap may be set as 900 milliseconds. As discussed above, this high degree of overlap increases the number of inference operations performed on each unit of audio data, and results in better performance of the trained neural network 40 since errors such as false negatives and false positives may be reduced.

The processor 12 may be further configured to process, via the time domain representation generator 56, each segment 34 of the run-time audio signal 50 in a time domain to generate a normalized time domain representation 57 of each segment 34 and feed the normalized time domain representation 57 of each segment 34 to an input layer of the trained neural network 40. Similarly to the training pre-processing 19 discussed above, the runtime audio signal 50 may also be converted to a one-dimensional normalized time domain representation 57 (e.g., a one-dimensional input vector containing parameterized, normalized values between zero and one representing the runtime audio signal in the time domain), instead of converting the signal to a two-dimensional time and frequency domain representation. This one-dimensional time domain conversion has the technical effect that it saves computational time that would otherwise be consumed during more complex preprocessing of the input signal, allowing the AI model 22 to be compact and achieve quick computational performance at run time.

The processor 12 may be further configured to generate, by the neural network 40, a plurality of predicted classification scores 62 and associated probabilities 64 for each class of audio event contained in each segment 34 of the run-time input audio signal 50. Each of these outputs is explained in turn below. As discussed above in the pre-processing, it will be appreciated that neural network architectures such as a convolutional neural network (CNN) and a recurrent neural network (RNN), including a long short-term memory (LSTM) RNN, may be employed, as the trained neural network 40.

Turning briefly to FIG. 3A, the predicted classification scores 62 and associated probabilities 64 will be explained further. FIG. 3A shows the predicted classification scores 62 and associated probabilities 64 for each of ten segments for class 1 and class 2 generated by the neural network 40. The predicted classification scores 62 are either 0 or 1, while the associated probabilities 64 are a number between 0 and 1. The predicted classification scores 62 are 1 when the associated probabilities 64 are equal or greater than a predetermined threshold, and conversely, the predicted classification scores 62 are 0 when the associated probabilities 64 are less than the predetermined threshold. When the predicted classification score 62 is 1, the class of audio event is deemed to be detected within the segment, and when the predicted classification is 0, the class of audio event is deemed to be not detected within the segment.

Turning back to FIG. 2, the processor 12 may be further configured to establish a plurality of candidate window sizes 70 for post-processing 66. In post-processing 66, the predicted classification scores 62 and associated probabilities 64 for the segments 34 may be converted to window-based predicted classifications and associated probabilities based on the candidate windows sizes 70 for further analysis. The candidate window sizes 70 may be integer numbers. For instance, in the example of FIG. 3A, a variable N defines the window size, and the window range is determined according to the depicted relationship. N of 3 results in a window size of that includes one segment before and one segment after a current segment 34, while a window size of 11 would include 5 segments on either side of a current segment 34. The plurality of candidate window sizes 70 are evaluated in parallel, to determine scores for each window size 70.

Thus, the processor 12 may be further configured to generate, via the smoothed score generator 68, smoothed predicted classification scores 76 and associated smoothed probabilities 77 for each class, for each of the candidate window sizes 70 by applying a predetermined smoothing function 69 and a predetermined prediction threshold 71 to the predicted classification scores 62 and the associated probabilities 64. An example of the computations used to generate the smoothed predicted classification scores 76 and associated smoothed probabilities 77 are described in FIG. 3A below.

The processor 12 may be further configured to determine a subset of the smoothed predicted classification scores 76 that exceed the predetermined prediction threshold 71 for each class, determine a number of consecutive segments within each window having a respective one of the candidate window sizes 70, for which the smoothed predicted classification scores exceed the predetermined prediction threshold, for each class, and compute a class window confidence value 78 for the determined number of consecutive segments, for each class, based on the smoothed predicted classification scores 76, associated smoothed probabilities 77, and the number of the consecutive segments. An example of the computation used to determine the class window confidence value 78 is described in FIG. 3B below.

FIGS. 3A and 3B show an example of the smoothed predicted classification scores 76, associated smoothed probabilities 77, and associated class-window confidence values 79 being computed using the computing system 10 during inference as shown in FIG. 2. In the depicted example, the predicted classification scores 62 and associated probabilities 64 for each of ten segments for class 1 and class 2 are generated by the trained neural network 40. Class 1 and class 2 are different audio events included in the segments 34. In this example, class 1 indicates a siren and class 2 indicates a dog barking. As discussed above, the predicted classification scores 62 are either 0 or 1, while the associated probabilities 64 are a number between 0 and 1. The predicted classification scores 62 are 1 when the associated probabilities 64 are equal or greater than a predetermined threshold, which is 0.5 in this example. The predicted classification scores 62 are 0 when the associated probabilities 64 are less than the predetermined threshold. For example, the associated probability 64 for segment "0" for class 1 is 0.75, which is greater than the predetermined threshold of 0.5. Thus, the predicted classification score 62 for segment "0" is 1 for class 1. This indicates that the class 1 audio event, which is the siren, is detected within the segment. On the other hand, the associated probability 64 for segment "0" for class 2 is 0.23, which is less than the predetermined threshold of 0.5. Thus, the predicted classification score 62 for segment "0" is 0 for class 2. This indicates that the class 2 audio event, which is the dog barking, is not detected within the segment. The predicted classification scores 62 for class 1 and class 2 for the rest of the segments 1-9 are computed in the same manner.

Next, the predicted classification scores 62 and associated probabilities 64 for the segments 34 are smoothed based on the candidate window sizes 70 and the smoothing function 69. The smoothing function 69 may be a mean, average, max, or identity smoothing function, for example. In this example, the window size $N_c$ is set as 3, the window range for smoothing is set as $[n-N_c/2:n+N_c/2]$, and average is used as the smoothing function 69, wherein the smoothed probability is rounded to the tenths place. For instance, the range is [0:1] for segment 0, [3:5] for segment 4, and [8:9] for segment 9. The smoothed probabilities 77 for class 1 are 0.76 (calculated as the rounded average of associated probabilities 0.75 and 0.76, or (0.75+0.76)/2) for segment 0; 0.55 (calculated as the rounded average of associated probabilities 0.67, 0.49, and 0.48, or (0.67+0.49+0.48)/3) for segment 4; and 0.40 (calculated as the rounded average of associated probabilities 0.12 and 0.67, or (0.12+0.67)/2) for segment 9. The smoothed predicted classification scores 76 for class 1 are 1 (calculated as the rounded average of predicted classifications 1 and 1, or (1+1)/2) for segment 0; 0.33 (calculated as the rounded average of predicted classifications 1, 0, and 0, or (1+0+0)/3) for segment 4; and 0.50 (calculated as the rounded average of predicted classifications 0 and 1 (0+1)/2) for segment 9. The rest of the smoothed predicted classification scores 76 and smoothed associated probabilities 77 for class 1 and class 2 are computed in the same manner. It will be appreciated that the candidate window size 70, the smoothing function 69, and the prediction threshold 71 may be optimized for precision and recall. Precision is the percentage of positive predictions that are correct, calculated as the ratio between the number of positive samples correctly classified and the total number of samples classified as positive. Recall is the percentage of positive cases that are properly detected, calculated as the ratio between the number of positive samples correctly classified as positive and the total number of positive samples. Improving precision typically reduces recall and vice versa. For instance, the candidate window size 70, the smoothing function 69, and the prediction threshold 71 may be optimized to achieve a higher precision and mid-level recall. Optimization may be performed heuristically by a user for each particular application, or according to an optimization formula that balances precision and recall, or favors one or the other to varying degrees.

Next, the class-window confidence values 78 are computed based on a formula 94 with the computed smoothed predicted classifications 76 and smoothed associated probabilities 77. As shown in Table 96 of FIG. 3B, the smoothed predicted classification 76 are multiplied by the smoothed associated probabilities 77 for each class, where the smoothed predicted classification 76 is considered as 0 when it is less than a prediction threshold 0.5. The number of consecutive windows in which an audio event is detected is identified by the processor 10. There are two sets of four consecutive segments 100 and 102 in class 1 and one set of eight consecutive segments 104 in class 2. An example window size of five is shown in dashed line, within which consecutive segments 100 were identified. Other similar windows exist but are not illustrated for the other consecutive segments 102, 104. The class-window confidence value 78 is computed for each set of the consecutive segments 100, 102, and 104 for each class, using formula (3), which has been derived from formulas (1) and (2) in FIG. 3B. A weight 79 to apply to each of the scores according to the statistical function (e.g., mean, average, etc.) discussed above is computed by Formula (1). Weights $W1_{class1}$, $W2_{class1}$, and $W1_{class2}$ are shown, and have values computed according to Formula (1). For example, $W1_{class1} = (1+1+1+0.67)/4 = 0.92$ for the first 4 consecutive segments 100 for class 1, $W2_{class1} = 0.63$ for the second 4 consecutive segments 102 for class 1, and $W1_{class2} = 0.73$ for the first 8 consecutive segments 104 for class 1. To compute the class-window confidence values 78. Formula (3) is applied, and as shown, $Confidence1_{class1} = (1*0.76+1*0.72+1*0.69+0.67*0.60)/4 = 0.64$. The other class-window confidence values 78 are computed similarly.

Furthermore, it will be appreciated that the associated class-window confidence values 78 for predetermined continuous audio events, which are based on longer consecutive segments, may be increased via a sigmoid function applied as the activation function in the output layer of the trained neural network 40.

It will also be appreciated that a user confidence level that corresponds to the class-window confidence values 78 may be provided to a user for knowledge of accuracy, and the user confidence value may be adjusted by a user to suit the user's needs as described in FIG. 4A-4D below.

Figure 4A:
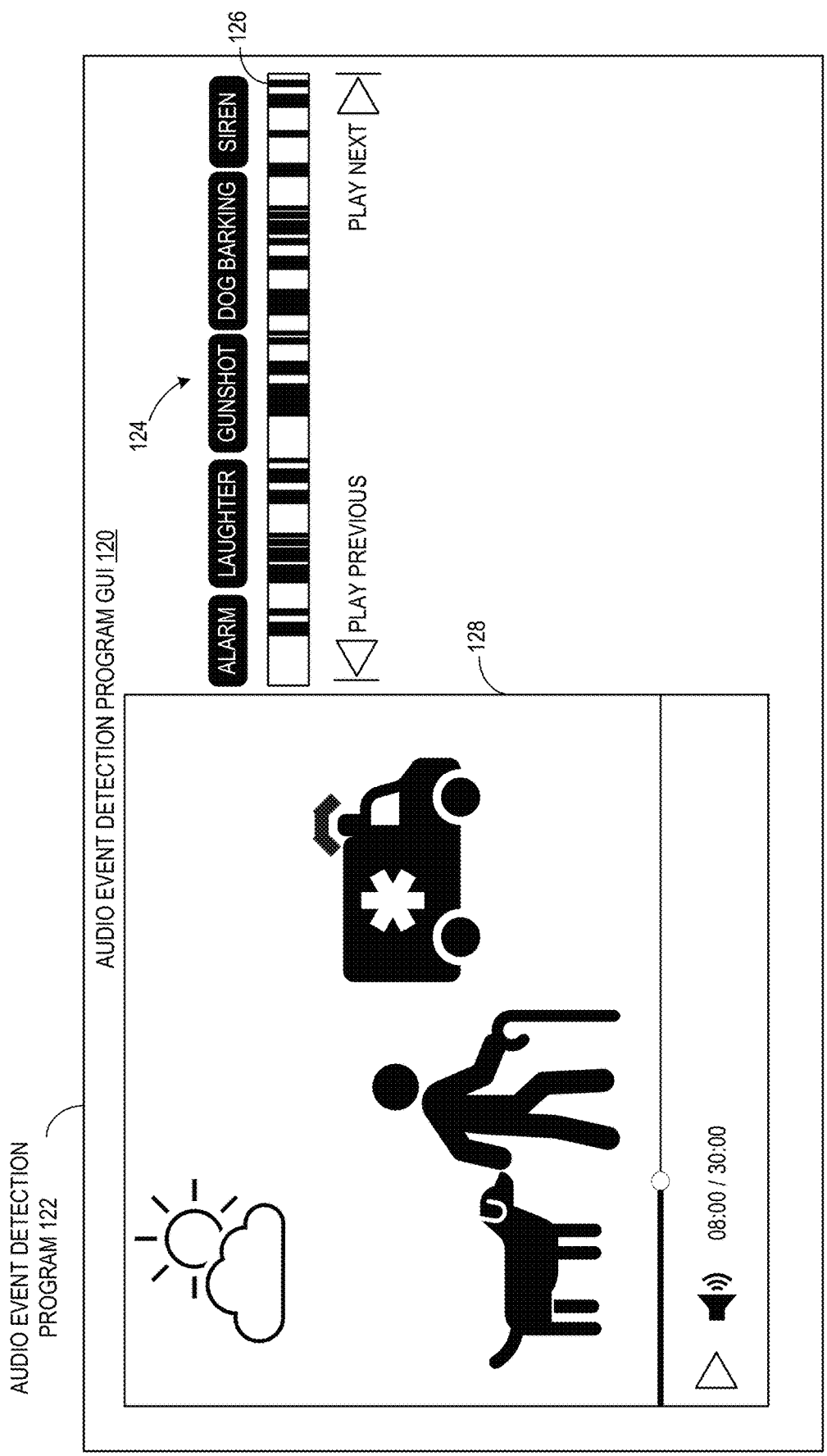
FIGS. 4A-4D show schematic views of different screens of an example audio event detection program GUI displayed using the computing system of FIGS. 1 and 2.
Figure 4B:
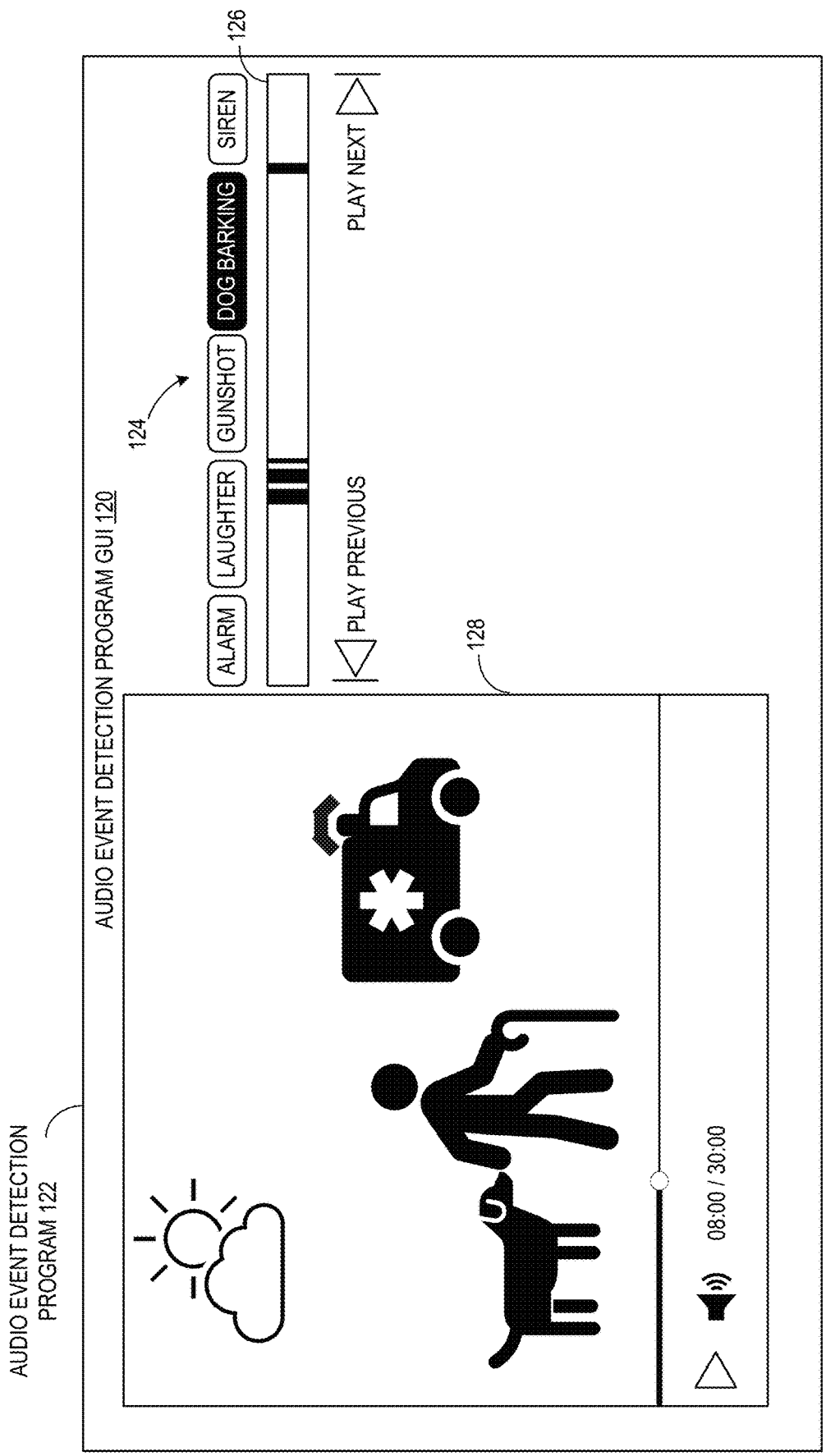

FIG. 4A-4D show a schematic view of different screens of an example audio event detection program GUI displayed using the computing system of FIG. 2. The AI model 22 configured for run-time inference with the trained neural network 40 of FIG. 2 may be incorporated into an audio event detection program 122, as shown in FIG. 4A. The audio event detection program may be a stand-alone program executed on processor 12 or may include an audio event detection program client executed on computing device 8. The audio event detection program 122 includes a video 128 (as source data 82 of FIG. 2) in which defined audio events 124 are contained in an audio track 84 (See FIG. 2) of the video 122. The defined audio events 124, which may include an alarm, laughter, gunshot, dog barking, and siren as non-limiting examples, are displayed together with an audio event detection bar 126. The audio event detection bar 126 shows time and duration of each defined audio event 124 which is manually selected by a user in the video 128. In this example of FIG. 4A, all the defined audio events 124 are selected by the user, and the audio event detection bar 126 shows time and duration of all the defined audio events 124. Turning to FIG. 4B, the audio event detection bar 126 shows the time and duration of the dog barking, selected by the user, within the audio track of the video 122.

Figure 4C:
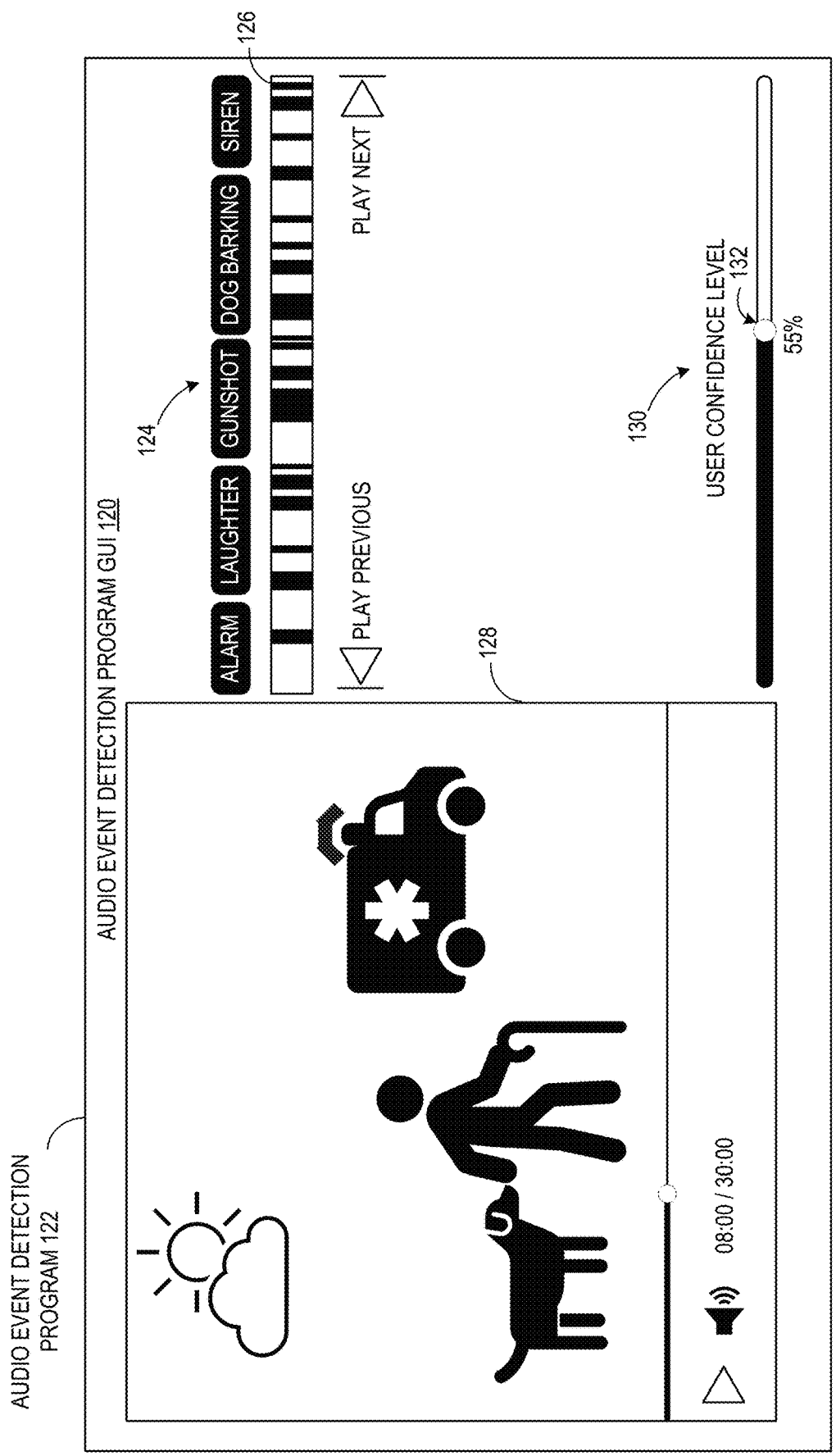
Figure 4D:
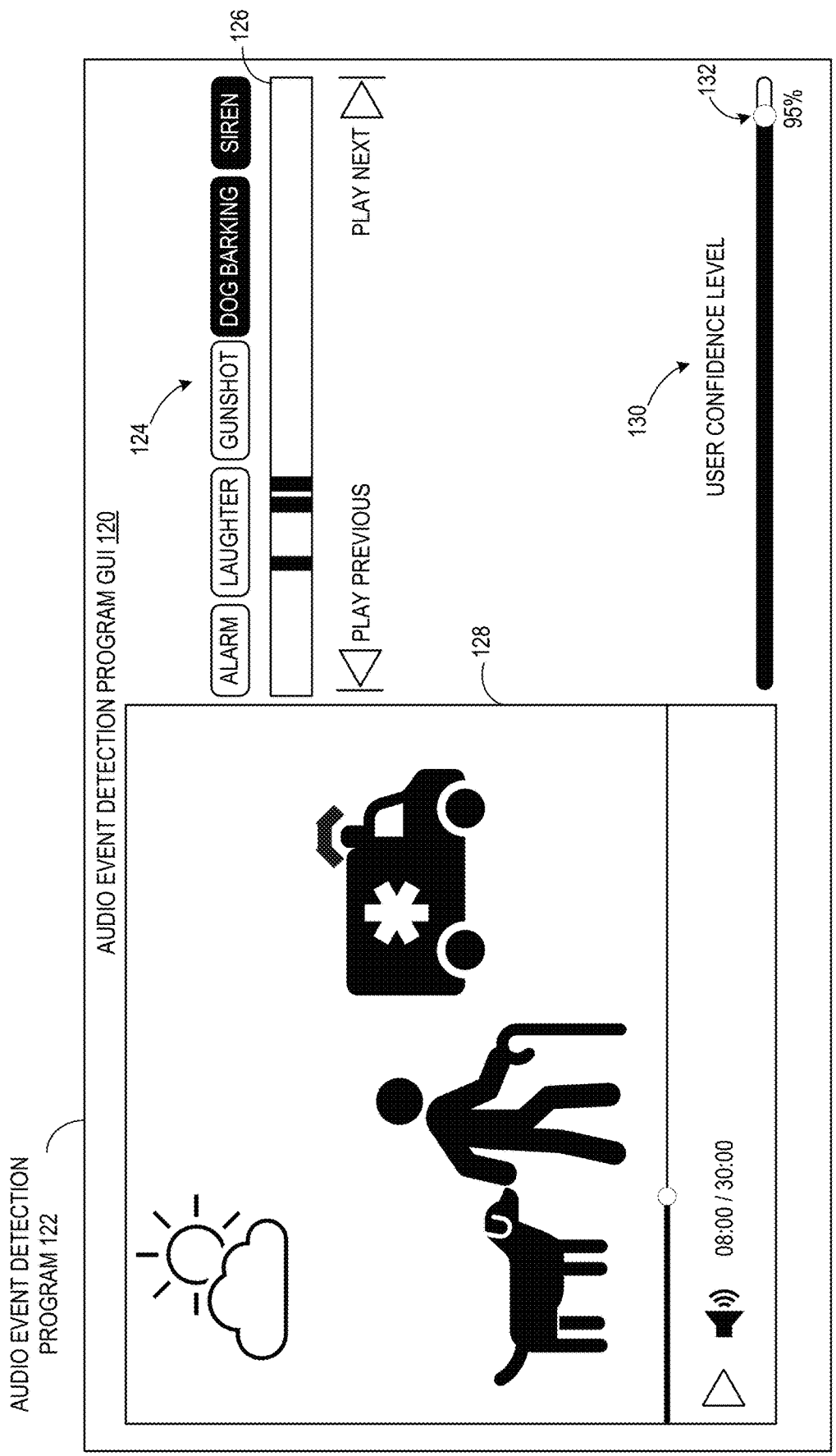

Turning to FIG. 4C, the user confidence level 130 may be displayed by the audio event detection program 122 and adjusted by a user. The user confidence level 130 corresponds to the class-window confidence values 78 outputted by the computing system 10 of FIG. 2. The correspondence between these values may be one to one, or may be set according to a correspondence formula. The confidence level 130 may be selected by a user by sliding a selector 132. In this example, the user confidence level 130 of 55% is selected by the user in order to determine the occurrences of the audio events 124 at the associated probability corresponding to the user confidence level 130. Turning to FIG. 4D, in the same manner, the user confidence level 130 of 95% is selected by the user in order to determine the occurrences of the audio events 124 at the associated probability corresponding to the user confidence level 130. As shown in FIGS. 4C and 4D, more audio events are detected and shown in the audio event detection bar 126 at the user confidence level 130 of 55%, while fewer audio events are detected and shown in the audio event detection bar 126 at the user confidence level 130 of 95%. Once a suitable number of detected audio events 27A are depicted in the GUI, the user may use editor 80 of FIG. 2 to perform operations on corresponding portions of the audio track to add, remove, or change the audio data associated with the detected audio event 27A, as described above in relation to FIG. 2.

Figure 5:
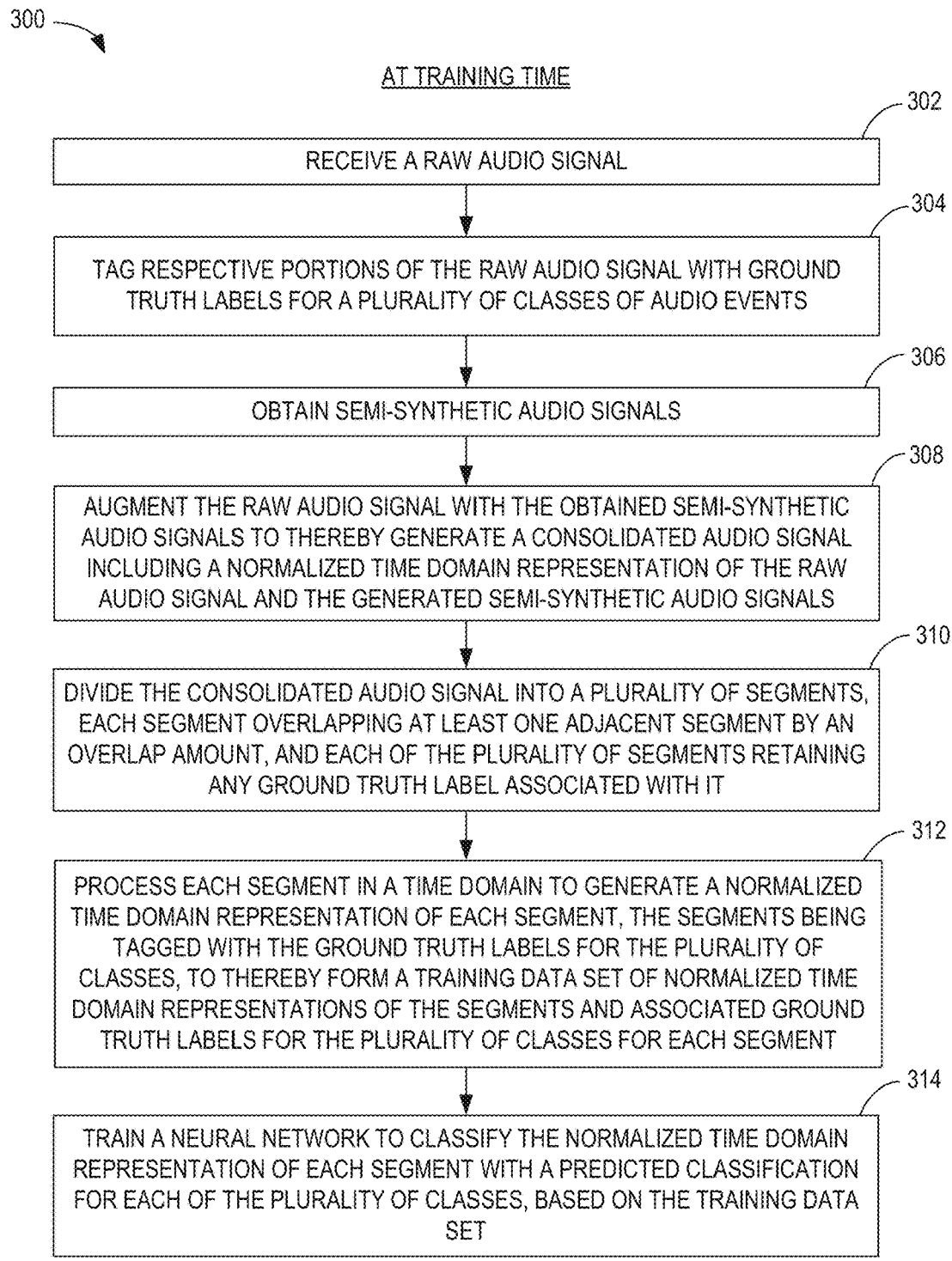
FIG. 5 shows a flowchart of a computerized method according to one example implementation of the computing system of FIGS. 1 and 2, at training time.

FIG. 5 shows a flowchart of a computerized method 300 according to one example implementation of the computing system of FIG. 1 at training time. At step 302, the method may include receiving a raw audio signal, at training time, via one or more processors of one or more computing devices and/or servers. At step 304, the method may further include tagging respective portions of the raw audio signal with ground truth labels for a plurality of classes of audio events. At step 306, the method may further include obtaining semi-synthetic audio signals. Advancing to step 308, the method may further include augmenting the raw audio signal with the obtained semi-synthetic audio signals to thereby generate a consolidated audio signal including a normalized time domain representation of the raw audio signal and the generated semi-synthetic audio signals. The semi-synthetic audio signals may be randomly or pseudo-randomly inserted into different locations in the raw audio signal. Reaching step 310, the method may further include dividing the consolidated audio signal into a plurality of segments, each segment overlapping at least one adjacent segment by an overlap amount, and each of the plurality of segments retaining any ground truth label associated with it. Each segment may overlap with at least one adjacent segment by 90% or more. At step 312, the method may further include processing each segment in a time domain to generate a normalized time domain representation of each segment, the segments being tagged with the ground truth labels for the plurality of classes, to thereby form a training data set of normalized time domain representations of the segments and associated ground truth labels for the plurality of classes for each segment. At step 314, the method may further include training a neural network to classify the normalized time domain representation of each segment with a predicted classification for each of the plurality of classes, based on the training data set. Each of the classes may be a defined audio event that is included in an audio track of a video, in which the audio event is editable by a curator of the video using an editor program on the video or a master file for the video. The trained neural network may be utilized by a computerized method below at run time.

Figure 6:
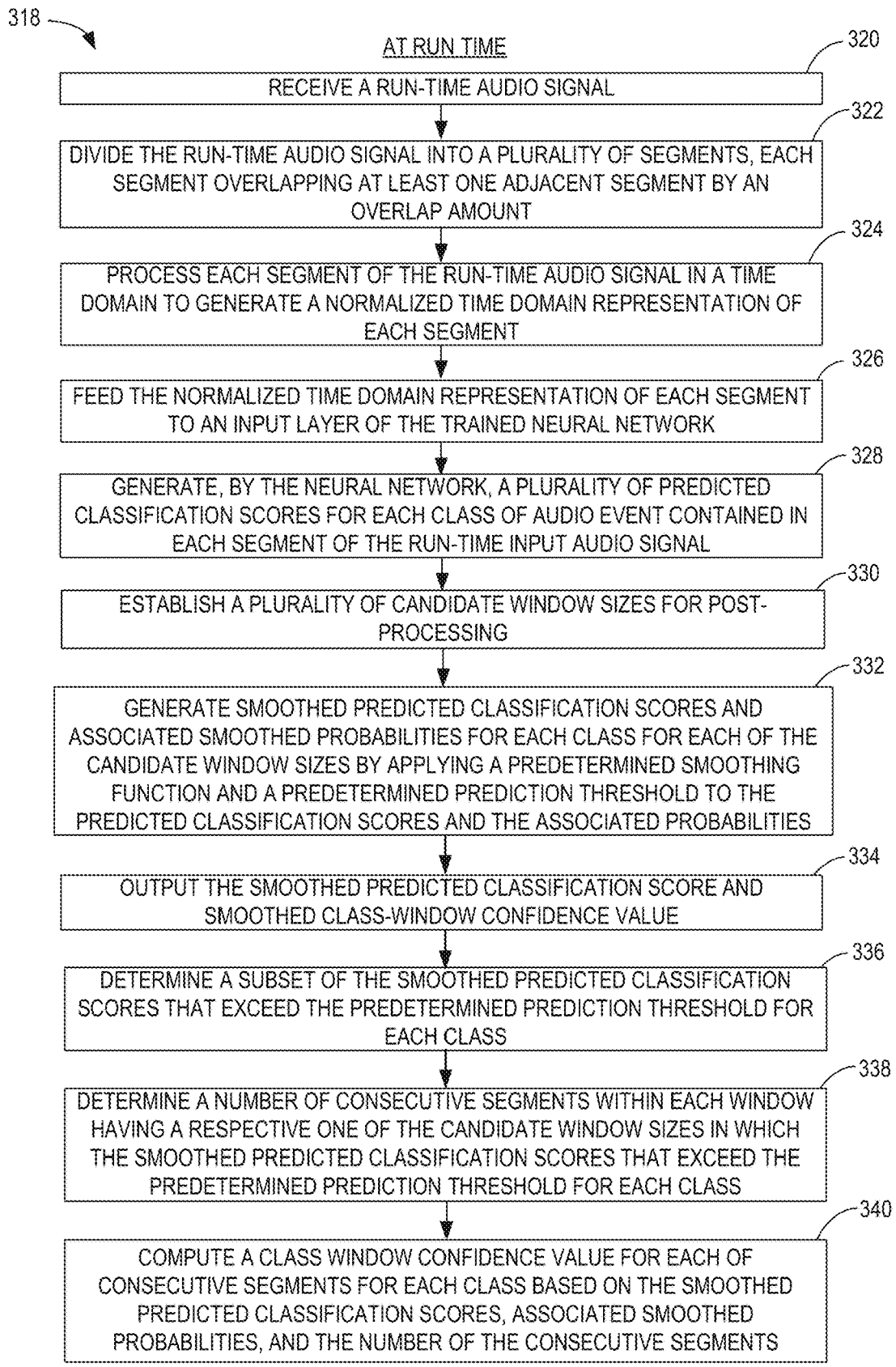
FIG. 6 shows a flowchart of a computerized method according to one example implementation of the computing system of FIGS. 1 and 2, at run time.

FIG. 6 shows a flowchart of a computerized method 318 according to one example implementation of the computing system of FIG. 2 at run time. At step 320, the method may include receiving a run-time audio signal at run time, via one or more processors of one or more computing devices and/or servers. At step 322, the method may further include dividing the run-time audio signal into a plurality of segments, each segment overlapping at least one adjacent segment by an overlap amount. Each segment may overlap with at least one adjacent segment by 90% or more, or by 80%, 95%, or other predetermined overlap amount that is relatively high. Advancing to step 324, the method may further include processing each segment of the run-time audio signal in a time domain to generate a normalized time domain representation of each segment. At step 326, the method may further include feeding the normalized time domain representation of each segment to an input layer of the trained neural network from method 300. At step 328, the method may further include generating, by the trained neural network, a plurality of predicted classification scores for each class of audio event contained in each segment of the run-time input audio signal. At step 330, the method may further include establishing a plurality of candidate window sizes for post-processing. At step 332, the method may further include generating smoothed predicted classification scores and associated smoothed probabilities for each class for each of the candidate window sizes by applying a predetermined smoothing function and a predetermined prediction threshold to the predicted classification scores and the associated probabilities. At step 334, the method may further include outputting the smoothed predicted classification scores and the associated probabilities. At step 336, the method may further include determining a subset of the smoothed predicted classification scores that exceed the predetermined prediction threshold for each class. At step 338, the method may further include determining a number of consecutive segments, within each window having a respective one of the candidate window sizes, for which the smoothed predicted classification scores exceed the predetermined prediction threshold, for each class. At step 340, the method may further include computing a class window confidence value for each determined number of consecutive segments, for each class, based on the smoothed predicted classification scores, associated smoothed probabilities, and the number of the consecutive segments. As described above, the method may further include outputting the class window confidence value to a downstream program such as an audio event detection program, editor program, etc., for use in the various applications described above.

Example applications of the above-described systems and methods include as a rating aid to evaluate content such as a movie, television show, or computer game cinematic, for particular audio events associated with more mature audience ratings, such as sounds associated with adult activities, loud gunshots, screams or explosions, violent outbursts by actors or animated characters, etc. Another application of the computing system 10 includes as a creative aid during production of a piece of content. For example, a sound director may produce an automated report of certain types of sounds that appear frequently in a movie, to ensure that audiences are not desensitized or overburdened with a particular sound, or to look for opportunities to insert certain sounds into the soundscape of the move where they are perceived as lacking. Another application of the computing system 10 is in automated screening of online content to detect unauthorized use of copyrighted material, based on a pattern of detected audio events in the content. Augmentation of the raw audio signal 24 during training with random or pseudo random semi-synthetic audio signals improves the accuracy (e.g., recall and precision) of the trained AI model even when applied to run time audio with noisy backgrounds. Finally, the speed and cost of running the AI model are improved due to use of the one-dimensional vector input, which eliminates costly pre-processing steps to convert the audio signal into two-dimensional time and frequency domain representation, as associated with some prior techniques.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
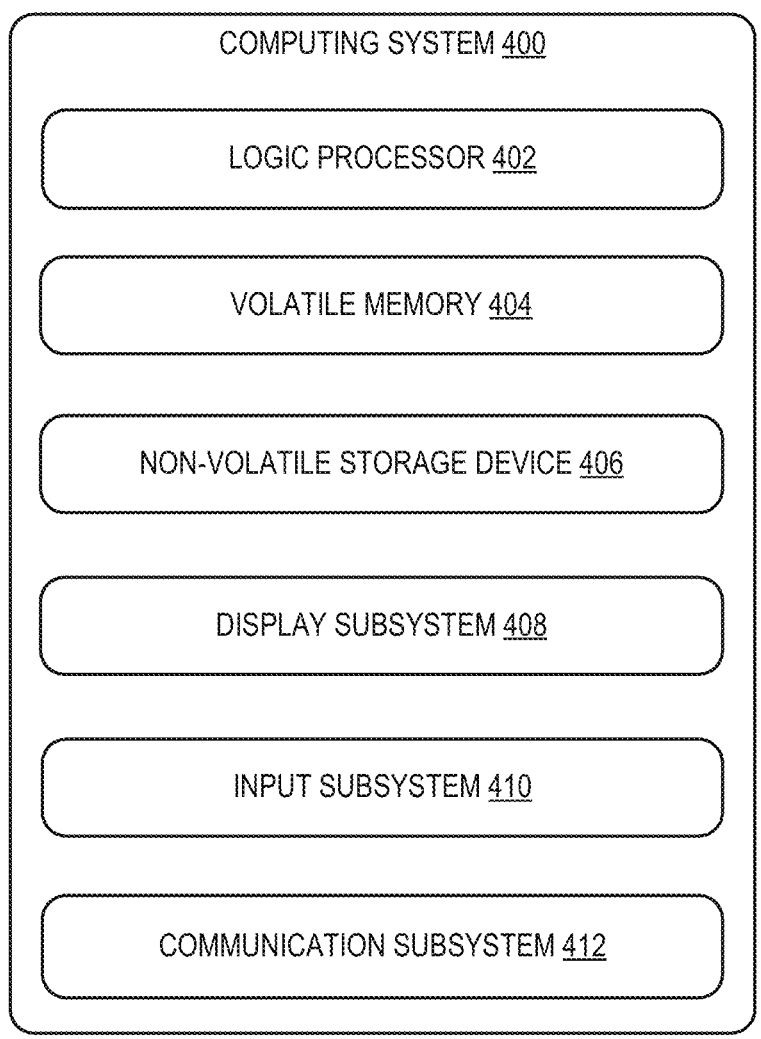
FIG. 7 shows a block diagram of an example computing system that may be utilized to implement the computing system of FIGS. 1 and 2.

FIG. 7 schematically shows a non-limiting embodiment of a computing system 400 that can enact one or more of the methods and processes described above. Computing system 400 is shown in simplified form. Computing system 400 may embody the computer device 10 described above and illustrated in FIG. 1 and FIG. 2. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display sub system 408, input sub system 410, communication sub system 412, and/or other components not shown in FIG. 7.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs discuss several aspects of the present disclosure. According to one aspect of the present disclosure, a computing system for detecting a plurality of classes of audio events is provided. The computing system may include one or more processors having associated memory storing instructions that cause the processors to, at run time, receive a run-time audio signal, and divide the run-time audio signal into a plurality of segments, each segment overlapping with at least one adjacent segment by an overlap amount. The one or more processors may be further configured to process each segment of the run-time audio signal in a time domain to generate a normalized time domain representation of each segment. The one or more processors may be further configured to feed the normalized time domain representation of each segment to an input layer of a trained neural network. The one or more processors may be further configured to generate, by the neural network, a plurality of predicted classification scores and associated probabilities for each class of audio event contained in each segment of the run-time input audio signal. The one or more processors may be further configured to establish a plurality of candidate window sizes for post-processing. The one or more processors may be further configured to generate smoothed predicted classification scores and associated smoothed probabilities for each class for each of the candidate window sizes by applying a predetermined smoothing function and a predetermined prediction threshold to the predicted classification scores and the associated probabilities. The one or more processors may be further configured to output the smoothed predicted classification scores and the associated probabilities.

According to this aspect, the one or more processors may be further configured to determine a subset of the smoothed predicted classification scores that exceed the predetermined prediction threshold, for each class. The one or more processors may be further configured to determine a number of consecutive segments, within each window having a respective one of the candidate window sizes, for which the smoothed predicted classification scores exceed the predetermined prediction threshold, for each class. The one or more processors may be further configured to compute a class window confidence value for each determined number of consecutive segments, for each class, based on the smoothed predicted classification scores, associated smoothed probabilities, and the number of the consecutive segments.

According to this aspect, a user confidence level corresponding to the smoothed class-window confidence value may be presented to a user and adjusted by the user.

According to this aspect, the candidate window sizes, the predetermined smoothing function, and the predetermined prediction threshold may be optimized.

According to this aspect, the run-time audio signal may be a raw audio signal.

According to this aspect, each segment may overlap with at least one adjacent segment by 90% or more.

According to this aspect, each of the classes may be a defined audio event that is included in an audio track of a video, in which the audio event may be editable by a curator of the video using an editor program on the video or a master file for the video.

According to this aspect, the audio event may be characterized by audio features that are shorter duration than a length of the segment.

According to this aspect, the associated class-window confidence value for predetermined continuous audio events may be increased via a sigmoid function.

According to this aspect, the smoothing function may be selected from a group consisting of mean, average, max, and identity.

According to another aspect of the present disclosure, a computerized method for detecting a plurality of classes of audio events is provided. The computerized method may include, via one or more processors of one or more computing devices and/or servers, at run time, receiving a run-time audio signal. The computerized method may further include dividing the run-time audio signal into a plurality of segments, each segment overlapping at least one adjacent segment by an overlap amount. The computerized method may further include processing each segment of the run-time audio signal in a time domain to generate a normalized time domain representation of each segment. The computerized method may further include feeding the normalized time domain representation of each segment to an input layer of a trained neural network. The computerized method may further include generating, by the neural network, a plurality of predicted classification scores and associated probabilities for each class of audio event contained in each segment of the run-time input audio signal. The computerized method may further include establishing a plurality of candidate window sizes for post-processing. The computerized method may further include generating smoothed predicted classification scores and associated smoothed probabilities for each class for each of the candidate window sizes by applying a predetermined smoothing function and a predetermined prediction threshold to the predicted classification scores and the associated probabilities. The computerized method may further include outputting the smoothed predicted classification scores and the associated probabilities.

According to this aspect, the computerized method may further include determining a subset of the smoothed predicted classification scores that exceed the predetermined prediction threshold for each class. The computerized method may further include determining a number of consecutive segments, within each window having a respective one of the candidate window sizes, for which the smoothed predicted classification scores exceed the predetermined prediction threshold, for each class. The computerized method may further include computing a class window confidence value for each determined number of consecutive segments, for each class, based on the smoothed predicted classification scores, associated smoothed probabilities, and the number of the consecutive segments.

According to this aspect, the computerized method may further include receiving a raw audio signal. The computerized method may further include tagging respective portions of the raw audio signal with ground truth labels for a plurality of classes of audio events. The computerized method may further include obtaining semi-synthetic audio signals. The computerized method may further include augmenting the raw audio signal with the obtained semi-synthetic audio signals to thereby generate a consolidated audio signal including a normalized time domain representation of the raw audio signal and the generated semi-synthetic audio signals. The computerized method may further include dividing the consolidated audio signal into a plurality of segments, each segment overlapping at least one adjacent segment by an overlap amount, and each of the plurality of segments retaining any ground truth label associated with it. The computerized method may further include processing each segment in a time domain to generate a normalized time domain representation of each segment, the segments being tagged with the ground truth labels for the plurality of classes, to thereby form a training data set of normalized time domain representations of the segments and associated ground truth labels for the plurality of classes for each segment. The computerized method may further include training a neural network to classify the normalized time domain representation of each segment with a predicted classification score for each of the plurality of classes, based on the training data set.

According to this aspect, the semi-synthetic audio signals may be randomly or pseudo-randomly inserted into different locations in the raw audio signal.

According to this aspect, each segment may overlap with at least one adjacent segment by 90% or more.

According to this aspect, each of the classes may be a defined audio event that is included in an audio track of a video, in which the audio event is editable by a curator of the video using an editor program on the video or a master file for the video.

According to another aspect of the present disclosure, a computing system for detecting a plurality of classes of audio events is provided. The computing system may include one or more processors having associated memory storing instructions that cause the one or more processors to, at training time, receive a raw audio signal. The one or more processors may be further configured to tag respective portions of the raw audio signal with ground truth labels for a plurality of classes of audio events. The one or more processors may be further configured to obtain semi-synthetic audio signals. The one or more processors may be further configured to augment the raw audio signal with the obtained semi-synthetic audio signals to thereby generate a consolidated audio signal including a normalized time domain representation of the raw audio signal and the generated semi-synthetic audio signals. The one or more processors may be further configured to divide the consolidated audio signal into a plurality of segments, each segment overlapping at least one adjacent segment by an overlap amount, and each of the plurality of segments retaining any ground truth label associated with it. The one or more processors may be further configured to process each segment in a time domain to generate a normalized time domain representation of each segment, the segments being tagged with the ground truth labels for the plurality of classes, to thereby form a training data set of normalized time domain representations of the segments and associated ground truth labels for the plurality of classes for each segment. The one or more processors may be further configured to train a neural network to classify the normalized time domain representation of each segment with a predicted classification score for each of the plurality of classes, based on the training data set.

According to this aspect, the one or more processors may be further configured to, at run-time after training time, receive a run-time audio signal. The processors may be further configured to divide the run-time audio signal into a plurality of segments, each segment overlapping at least one adjacent segment by an overlap amount. The one or more processors may be further configured to process each segment of the run-time audio signal in a time domain to generate a normalized time domain representation of each segment. The one or more processors may be further configured to feed the normalized time domain representations of each segment to an input layer of the trained neural network. The one or more processors may be further configured to generate, by the neural network, a plurality of predicted classification scores and associated probabilities for each class of audio event contained in each segment of the run-time input audio signal. The one or more processors may be further configured to establish a plurality of candidate window sizes for post-processing. The one or more processors may be further configured to generate smoothed predicted classification scores and associated smoothed probabilities for each class for each of the candidate window sizes by applying a predetermined smoothing function and a predetermined prediction threshold to the predicted classification scores and the associated probabilities. The one or more processors may be further configured to output the smoothed predicted classification scores and the associated probabilities.

According to this aspect, the one or more processors may be further configured to determine a subset of the smoothed predicted classification scores that exceed the predetermined prediction threshold for each class. The one or more processors may be further configured to determine a number of consecutive segments, within each window having a respective one of the candidate window sizes, for which the smoothed predicted classification scores exceed the predetermined prediction threshold, for each class. The one or more processors may be further configured to compute a class window confidence value for each determined number of consecutive segments, for each class, based on the smoothed predicted classification scores, associated smoothed probabilities, and the number of the consecutive segments.

According to this aspect, the semi-synthetic audio signals may be randomly or pseudo-randomly inserted into different locations in the raw audio signal.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for detecting a plurality of classes of audio events, the system comprising:
one or more processors having associated memory storing instructions that cause the one or more processors to, at run time:
receive a run-time audio signal;
divide the run-time audio signal into a plurality of segments, each segment of the plurality of segments overlapping with at least one adjacent segment by an overlap amount;
process each segment of the plurality of segments in a time domain to generate a normalized time domain representation of each segment of the plurality of segments;
feed the normalized time domain representation of each segment of the plurality of segments to an input layer of a trained neural network;
generate, by the trained neural network, a plurality of predicted classification scores and associated probabilities for each class of audio event contained in each segment of the plurality of segments;
establish a plurality of candidate window sizes for post-processing, wherein an individual candidate window size of the plurality of window sizes is an integer number of segments;
generate smoothed predicted classification scores and associated smoothed probabilities for each class of audio event for each candidate window size of the plurality of candidate window sizes by applying a predetermined smoothing function and a predetermined prediction threshold to the plurality of predicted classification scores and the associated probabilities; and output the smoothed predicted classification scores and the associated probabilities.

2. The computing system of claim 1, wherein the one or more processors are further caused to:

determine a subset of the smoothed predicted classification scores that exceed the predetermined prediction threshold, for each class of audio event;

determine a number of consecutive segments, within each window having a respective one of the plurality of candidate window sizes, for which the smoothed predicted classification scores exceed the predetermined prediction threshold, for each class of audio event; and compute a class window confidence value for each determined number of consecutive segments, for each class of audio event, based on the smoothed predicted classification scores, associated smoothed probabilities, and the number of the consecutive segments.

3. The computing system of claim 2, wherein a user confidence level corresponding to the class window confidence value is presented to a user and is adjusted by the user.

4. The computing system of claim 2, wherein the class window confidence value for predetermined continuous audio events is increased via a sigmoid function.

5. The computing system of claim 1, wherein the plurality of candidate window sizes, the predetermined smoothing function, and the predetermined prediction threshold are optimized.

6. The computing system of claim 1, wherein the run-time audio signal is a raw audio signal.

7. The computing system of claim 1, wherein each segment of the plurality of segments overlaps with the at least one adjacent segment by 90% or more.

8. The computing system of claim 1, wherein each class of audio event is a defined audio event that is included in an audio track of a video, wherein the defined audio event is editable by a curator of the video using an editor program on the video or a master file for the video.

9. The computing system of claim 1, wherein an individual class of audio event can be characterized by audio features that are shorter duration than a length of the segment.

10. The computing system of claim 1, wherein the predetermined smoothing function is selected from a group consisting of mean, average, max, and identity.

11. A computerized method for detecting a plurality of classes of audio events, implemented via one or more processors of one or more computing devices and/or servers at run time, the method comprising:

receiving a run-time audio signal;

dividing the run-time audio signal into a plurality of segments, each segment of the plurality of segments overlapping at least one adjacent segment by an overlap amount;

processing each segment of the plurality of segments in a time domain to generate a normalized time domain representation of each segment of the plurality of segments;

feeding the normalized time domain representation of each segment of the plurality of segment to an input layer of a trained neural network;

generating, by the trained neural network, a plurality of predicted classification scores and associated probabilities for each class of audio event contained in each segment of the plurality of segments;

establishing a plurality of candidate window sizes for post-processing, wherein an individual candidate window size of the plurality of window sizes is an integer number of segments;

generating smoothed predicted classification scores and associated smoothed probabilities for each class of audio event for each candidate window size of the plurality of candidate window sizes by applying a predetermined smoothing function and a predetermined prediction threshold to the plurality of predicted classification scores and the associated probabilities; and outputting the smoothed predicted classification scores and the associated probabilities.

12. The computerized method of claim 11, further comprising:

determining a subset of the smoothed predicted classification scores that exceed the predetermined prediction threshold for each class of audio event;

determining a number of consecutive segments, within each window having a respective one of the plurality of candidate window sizes, for which the smoothed predicted classification scores exceed the predetermined prediction threshold, for each class of audio event; and computing a class window confidence value for each determined number of consecutive segments, for each class of audio event, based on the smoothed predicted classification scores, associated smoothed probabilities, and the number of the consecutive segments.

13. The computerized method of claim 11, further comprising, at training time:

receiving a raw audio signal;

tagging respective portions of the raw audio signal with ground truth labels for the plurality of classes of audio events;

obtaining semi-synthetic audio signals;

augmenting the raw audio signal with the semi-synthetic audio signals to thereby generate a consolidated audio signal including a normalized time domain representation of the raw audio signal and the semi-synthetic audio signals;

dividing the consolidated audio signal into a plurality of training segments, each training segment of the plurality of training segments overlapping at least one adjacent training segment by another overlap amount and retaining any of the ground truth labels with which the training segments is associated;

processing each training segment the plurality of training segments in another time domain to generate another normalized time domain representation of each training segment the plurality of training segments, the plurality of segments being tagged with the ground truth labels for the plurality of classes of audio events, to thereby form a training data set of normalized time domain representations; and training a neural network to classify the normalized time domain representation of each segment the plurality of segments with a predicted classification score for each of the plurality of classes of audio events, based on the training data set.

14. The computerized method of claim 13, wherein the semi-synthetic audio signals are randomly or pseudo-randomly inserted into different locations in the raw audio signal.

15. The computerized method of claim 11, wherein each segment of the plurality of segments overlaps with the at least one adjacent segment by 90% or more.

16. The computerized method of claim 11, wherein each class of audio event is a defined audio event that is included in an audio track of a video, wherein the defined audio event is editable by a curator of the video using an editor program on the video or a master file for the video.

17. One or more storage devices storing computer-executable instructions for detecting a plurality of classes of audio events, the computer-executable instructions, when executed by one or more processors, causing the one or more processors to, at run time:
receive a run-time audio signal;
divide the run-time audio signal into a plurality of segments, each segment of the plurality of segments overlapping with at least one adjacent segment by an overlap amount;
process each segment of the plurality of segments in a time domain to generate a normalized time domain representation of each segment of the plurality of segments;
feed the normalized time domain representation of each segment of the plurality of segments to an input layer of a trained neural network;
generate, by the trained neural network, a plurality of predicted classification scores and associated probabilities for each class of audio event contained in each segment of the plurality of segments;
establish a plurality of candidate window sizes for post-processing, wherein an individual candidate window size of the plurality of window sizes is an integer number of segments;
generate smoothed predicted classification scores and associated smoothed probabilities for each class of audio event for each candidate window size of the plurality of candidate window sizes by applying a predetermined smoothing function and a predetermined prediction threshold to the plurality of predicted classification scores and the associated probabilities; and
output the smoothed predicted classification scores and the associated probabilities.

18. The one or more storage devices of claim 17, wherein the one or more processors are further caused to:
determine a subset of the smoothed predicted classification scores that exceed the predetermined prediction threshold, for each class of audio event;
determine a number of consecutive segments, within each window having a respective one of the plurality of candidate window sizes, for which the smoothed predicted classification scores exceed the predetermined prediction threshold, for each class of audio event; and
compute a class window confidence value for each determined number of consecutive segments, for each class of audio event, based on the smoothed predicted classification scores, associated smoothed probabilities, and the number of the consecutive segments.

19. The one or more storage devices of claim 18, wherein a user confidence level corresponding to the class window confidence value is presented to a user and is adjusted by the user.

20. The one or more storage devices of claim 17, wherein each class of audio event is a defined audio event that is included in an audio track of a video, wherein the defined audio event is editable by a curator of the video using an editor program on the video or a master file for the video.

* * * * *